United States Patent
Kairali et al.

(10) Patent No.: US 12,230,128 B2
(45) Date of Patent: Feb. 18, 2025

(54) DYNAMIC ARRANGEMENT OF VEHICLES BASED ON LOAD CAPACITY OF SMART CROSSING

(71) Applicant: INTERNATIONAL BUSINESS MACHINES CORPORATION, Armonk, NY (US)

(72) Inventors: Sudheesh S. Kairali, Kozhikode (IN); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 236 days.

(21) Appl. No.: 18/060,623

(22) Filed: Dec. 1, 2022

(65) Prior Publication Data

US 2024/0185710 A1 Jun. 6, 2024

(51) Int. Cl.
G08G 1/01 (2006.01)
G06F 30/20 (2020.01)
G06F 113/00 (2020.01)

(52) U.S. Cl.
CPC .......... *G08G 1/0137* (2013.01); *G06F 30/20* (2020.01); *G06F 2113/00* (2020.01)

(58) Field of Classification Search
CPC .... G08G 1/0137; G06F 30/20; G06F 2113/00
See application file for complete search history.

(56) References Cited

U.S. PATENT DOCUMENTS

| | | | |
|---|---|---|---|
| 2013/0285820 A1* | 10/2013 | Assuncao | G01W 1/10 702/3 |
| 2015/0198502 A1* | 7/2015 | Phares | G01M 5/0008 702/42 |

(Continued)

FOREIGN PATENT DOCUMENTS

| | | |
|---|---|---|
| CN | 114444983 A | 5/2022 |
| WO | 2019159042 A1 | 8/2019 |

OTHER PUBLICATIONS

Dan et al., Digital Twin System of Bridges Group Based on Machine Vision Fusion Monitoring of Bridge Traffic Load, 2021 (Year: 2021).*

(Continued)

*Primary Examiner* — James J Lee
*Assistant Examiner* — Alexander George Matta
(74) *Attorney, Agent, or Firm* — Robert R. Aragona (57) ABSTRACT

An embodiment for dynamically arranging vehicles on a smart crossing is provided. The embodiment may include receiving data relating to a maximum carrying capacity of a smart crossing having one or more sensors. The embodiment may also include predicting a current load carrying capacity of the smart crossing. The embodiment may further include identifying a number of vehicles traveling towards the smart crossing within a pre-defined distance of the smart crossing. The embodiment may also include identifying one or more specifications and a current arrangement of each vehicle. The embodiment may further include executing a digital twin simulation of a digital twin model of each vehicle driving across the smart crossing. The embodiment may also include in response to determining the current load carrying capacity is exceeded, assigning a priority level to each vehicle. The embodiment may further include predicting a modification of the current arrangement of each vehicle.

17 Claims, 4 Drawing Sheets

(56) References Cited

U.S. PATENT DOCUMENTS

| | | | | |
|---|---|---|---|---|
| 2020/0334982 | A1* | 10/2020 | Wisnewski | G08G 1/0129 |
| 2021/0327265 | A1* | 10/2021 | Schulte | H04W 4/44 |
| 2023/0039656 | A1* | 2/2023 | Yan | G08G 1/0125 |
| 2024/0096212 | A1* | 3/2024 | Khosla | G08G 1/0145 |

OTHER PUBLICATIONS

Dan, et al., "Digital Twin System of Bridges Group Based on Machine Vision Fusion Monitoring of Bridge Traffic Load", IEEE Transactions on Intelligent Transportation Systems, Dec. 2021, 17 Pages. https://www.researchgate.netpublication/356950949_Digital_Twin_System_of_Bridges_Group_Based_on_Machine_Vision_Fusion_Monitoring_of_Bridge_Traffic_Load.

Disclosed Anonymously, "Method and system for automatic travel lane selection based on vehicle and road parameter in autonomous vehicle ecosystem", ip.com, IPCOM000251595D, Nov. 15, 2017, 3 Pages. https://priorart.ip.com/IPCOM/000251595.

Disclosed Anonymously, "Method and System for Dynamic Offset Travel Path Creation for Autonomous Vehicles", ip.com, IPCOM000259217D, Jul. 19, 2019, 6 Pages. https://priorart.ip.com/IPCOM/000259217.

Sandovic, et al., "Experimental and Analytical Investigation of Deformations and Stress Distribution in Steel Bands of a Two-Span Stress-Ribbon Pedestrian Bridge", Hindawi, vol. 2017, Article ID 9324520, May 27, 2017, 12 Pages. https://www.hindawi.com/journals/mpe/2017/9324520/.

Writer, "What Is the Difference Between Static and Dynamic Loads?", Reference.com, Mar. 31, 2020, 3 Pages. https://www.reference.com/science/difference-between-static-dynamic-loads-f1b21594c8bdf4b1.

* cited by examiner

DYNAMIC ARRANGEMENT OF VEHICLES BASED ON LOAD CAPACITY OF SMART CROSSING

BACKGROUND

The present invention relates generally to the field of computing, and more particularly to a system for dynamically arranging vehicles on a smart crossing based on a load capacity of the smart crossing.

In any city, there may be different types of roads and crossings for vehicles. The crossings may include, but are not limited to, bridges, tunnels, overpasses, and/or viaducts. These crossings may have pre-defined load carrying capacities to prevent damage to the crossings and extend the service life of the crossings. The load carried by the vehicles may be either static or dynamic. For example, a truck that is not moving on a bridge due to heavy traffic may be carrying a static load. On the other hand, once the truck begins to move, the load may become dynamic, as forces caused by movements of the vehicles may cause the load to shift inside the truck.

SUMMARY

According to one embodiment, a method, computer system, and computer program product for dynamically arranging vehicles on a smart crossing based on a load capacity of the smart crossing is provided. The embodiment may include receiving data relating to a maximum carrying capacity of a smart crossing having one or more sensors measuring one or more safety parameters of the smart crossing. The embodiment may also include predicting a current load carrying capacity of the smart crossing based on the maximum carrying capacity and the one or more safety parameters. The embodiment may further include identifying a number of vehicles on a roadway traveling towards the smart crossing within a pre-defined distance of the smart crossing. The embodiment may also include identifying one or more specifications and a current arrangement of each vehicle within the pre-defined distance of the smart crossing. The embodiment may further include executing a digital twin simulation of a digital twin model of each vehicle driving across the smart crossing in accordance with the one or more specifications and current arrangement. The embodiment may also include in response to determining the current load carrying capacity is exceeded based on the executed digital twin simulation, assigning a priority level to each vehicle within the pre-defined distance based on a classification of each vehicle. The embodiment may further include predicting a modification of the current arrangement of each vehicle based on the priority level of each vehicle and the one or more specifications.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to a system for dynamically arranging vehicles on a smart crossing based on a load capacity of the smart crossing. The following described exemplary embodiments provide a system, method, and program product to, among other things, predict a modification of a current arrangement of vehicles on a roadway based on a priority level and one or more specifications of each vehicle and, accordingly, automatically deploy each vehicle to the smart crossing consistent with the modification of the current arrangement. Therefore, the present embodiment has the capacity to improve traffic management technology and infrastructure by dynamically arranging vehicles to distribute the load of the vehicles uniformly across the smart crossing.

As previously described, in any city, there may be different types of roads and crossings for vehicles. The crossings may include, but are not limited to, bridges, tunnels, overpasses, and/or viaducts. These crossings may have pre-defined load carrying capacities to prevent damage to the crossings and extend the service life of the crossings. The load carried by the vehicles may be either static or dynamic. For example, a truck that is not moving on a bridge due to heavy traffic may be carrying a static load. On the other hand, once the truck begins to move, the load may become dynamic, as forces caused by movements of the vehicles may cause the load to shift inside the truck. In various contextual situations, the bridges, tunnels, overpasses, and/or viaducts may become overloaded due to the number and weight of the vehicles traveling on the crossing. This problem is typically addressed by closing lanes on the crossing during certain times of the day to reduce congestion. However, closing lanes on the crossing may cause an enormous backup of traffic leading up to the crossing and fails to proactively arrange the vehicles prior to reaching the crossing.

It may therefore be imperative to have a system in place to dynamically arrange vehicles to distribute the load of the vehicles uniformly across the smart crossing. Thus, embodiments of the present invention may provide advantages including, but not limited to, dynamically and proactively arranging vehicles prior to reaching the smart crossing, distributing the load of the vehicles uniformly across the smart crossing, and extending the service life of the smart crossing with minimum traffic backups. The present invention does not require that all advantages need to be incorporated into every embodiment of the invention.

According to at least one embodiment, when vehicles are driving towards a smart crossing, data relating to a maximum carrying capacity of the smart crossing having one or more sensors measuring one or more safety parameters of the smart crossing may be received in order to predict a current load carrying capacity of the smart crossing based on the maximum carrying capacity and the one or more safety parameters. Upon predicting the current load carrying capacity, a number of vehicles travelling on a roadway towards the smart crossing within a pre-defined distance of the smart crossing may be identified so that one or more specifications and a current arrangement of each vehicle within the pre-defined distance may also be identified. According to at least one embodiment, the specification may be an aggregated weight of each vehicle and/or a length of each vehicle. According to at least one other embodiment, the specification may be a number of wheels of each vehicle. Then, a digital twin simulation of a digital twin model of each vehicle driving across the smart crossing may be executed in accordance with the one or more specifications and the current arrangement such that it may be determined whether the current load carrying capacity of the smart crossing is exceeded. In response to determining the current load carrying capacity is exceeded, a priority level may be assigned to each vehicle within the pre-defined distance based on a classification of each vehicle in order to predict a modification of the current arrangement of each vehicle based on the priority level of each vehicle and the one or more specifications. Upon predicting the modification, each vehicle may be automatically deployed to the smart crossing consistent with the modification of the current arrangement of each vehicle. The predicted modification may be verified by executing an updated digital twin simulation of the digital twin model of each vehicle driving across the smart crossing in accordance with the modification of the current arrangement.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following described exemplary embodiments provide a system, method, and program product to predict a modification of a current arrangement of vehicles on a roadway based on a priority level and one or more specifications of each vehicle and, accordingly, automatically deploy each vehicle to the smart crossing consistent with the modification of the current arrangement.

Figure 1:
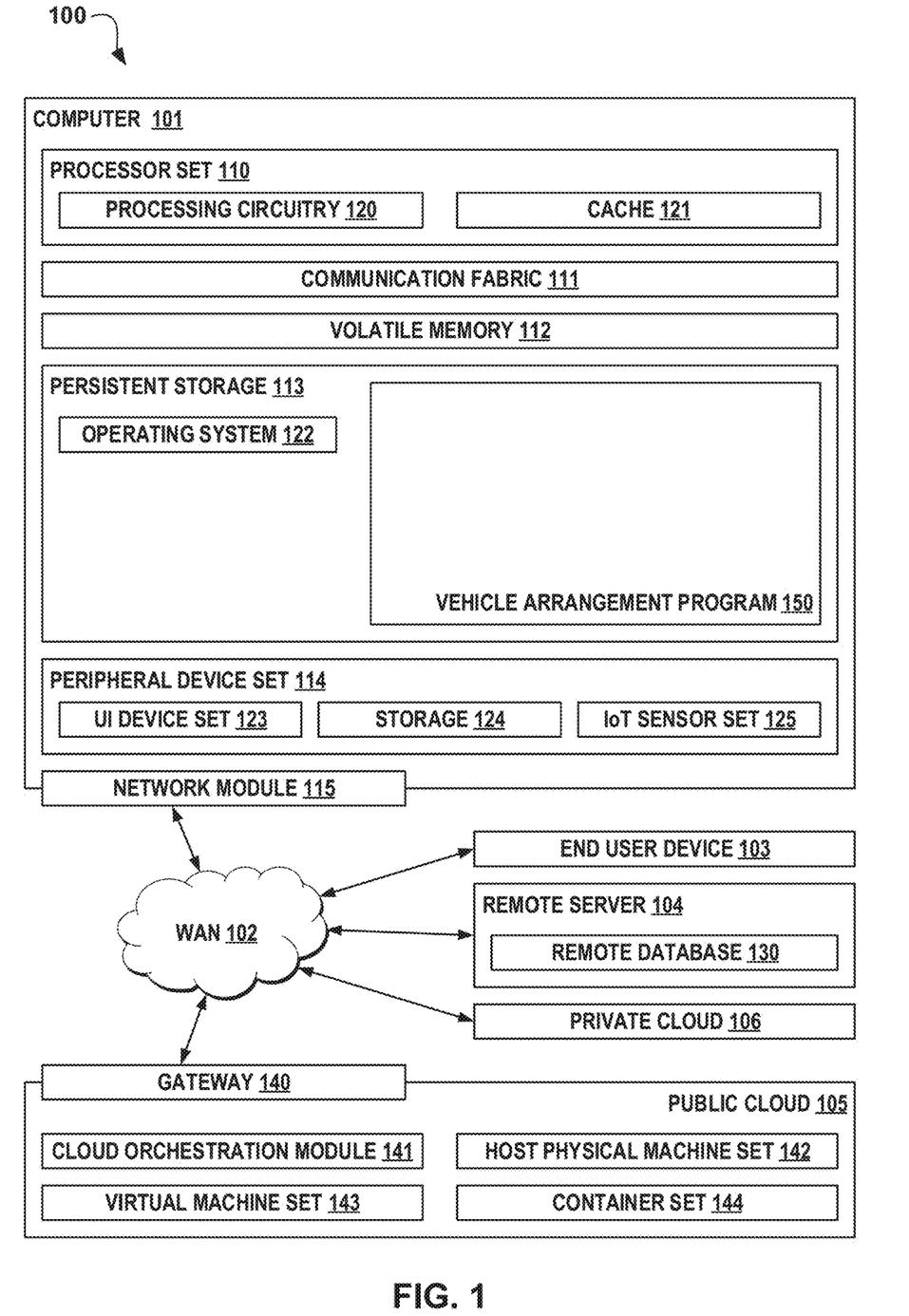
FIG. 1 illustrates an exemplary computing environment according to at least one embodiment.

Referring to FIG. 1, an exemplary computing environment 100 is depicted, according to at least one embodiment. Computing environment 100 contains an example of an environment for the execution of at least some of the computer code involved in performing the inventive methods, such as a vehicle arrangement program 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory 112 may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage 113 allows writing of data, deletion of data and re-writing of data. Some familiar forms of persistent storage 113 include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

Peripheral device set 114 includes the set of peripheral devices of computer 101. Data communication connections between the peripheral devices 114 and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database), this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector. Peripheral device set 114 may also include an autonomous vehicle, a GPS device, a camera, biometric sensors, weight measurement sensors, force measurement sensors, frequency measurement sensors, and/or any other device for measuring health of a smart crossing.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN 102 and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments the private cloud 106 may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the vehicle arrangement program 150 may be a program capable of receiving data relating to a maximum carrying capacity of a smart crossing having one or more sensors measuring one or more safety parameters of the smart crossing, predicting a modification of a current arrangement of vehicles on a roadway based on a priority level and one or more specifications of each vehicle, automatically deploying each vehicle to the smart crossing consistent with the modification of the current arrangement, dynamically and proactively arranging the vehicles prior to reaching the smart crossing, distributing the load of the vehicles uniformly across the smart crossing, and extending the service life of the smart crossing with minimum traffic backups. Furthermore, notwithstanding depiction in computer 101, the vehicle arrangement program 150 may be stored in and/or executed by, individually or in any combination, end user device 103, remote server 104, public cloud 105, and private cloud 106. The vehicle arrangement method is explained in further detail below with respect to FIGS. 2A and 2B. It may be appreciated that the examples described below are not intended to be limiting, and that in embodiments of the present invention the parameters used in the examples may be different.

Figure 2A:
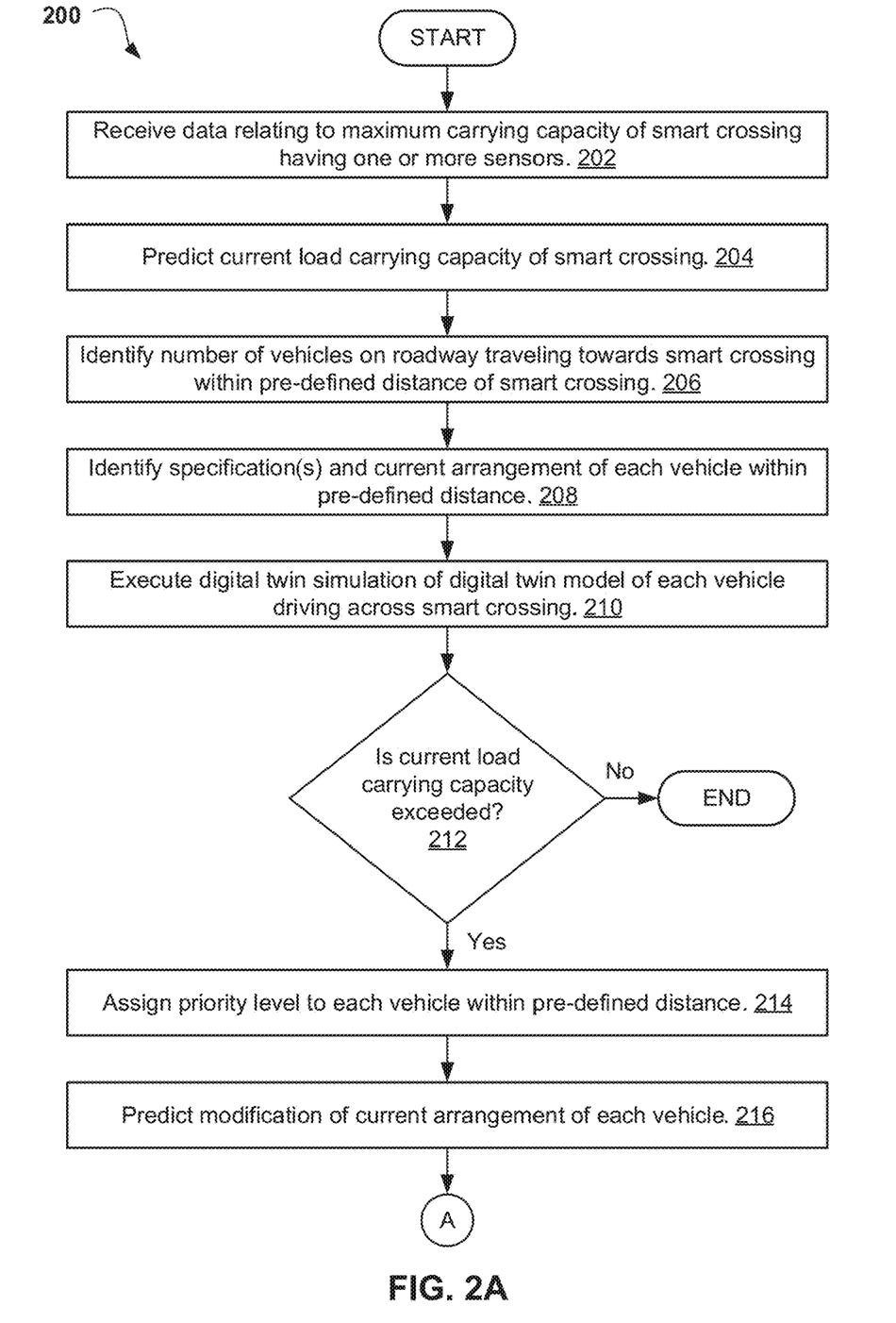
FIGS. 2A and 2B illustrate an operational flowchart for dynamically arranging vehicles on a smart crossing based on a load capacity of the smart crossing in a dynamic vehicle arrangement process according to at least one embodiment.
Figure 2B:
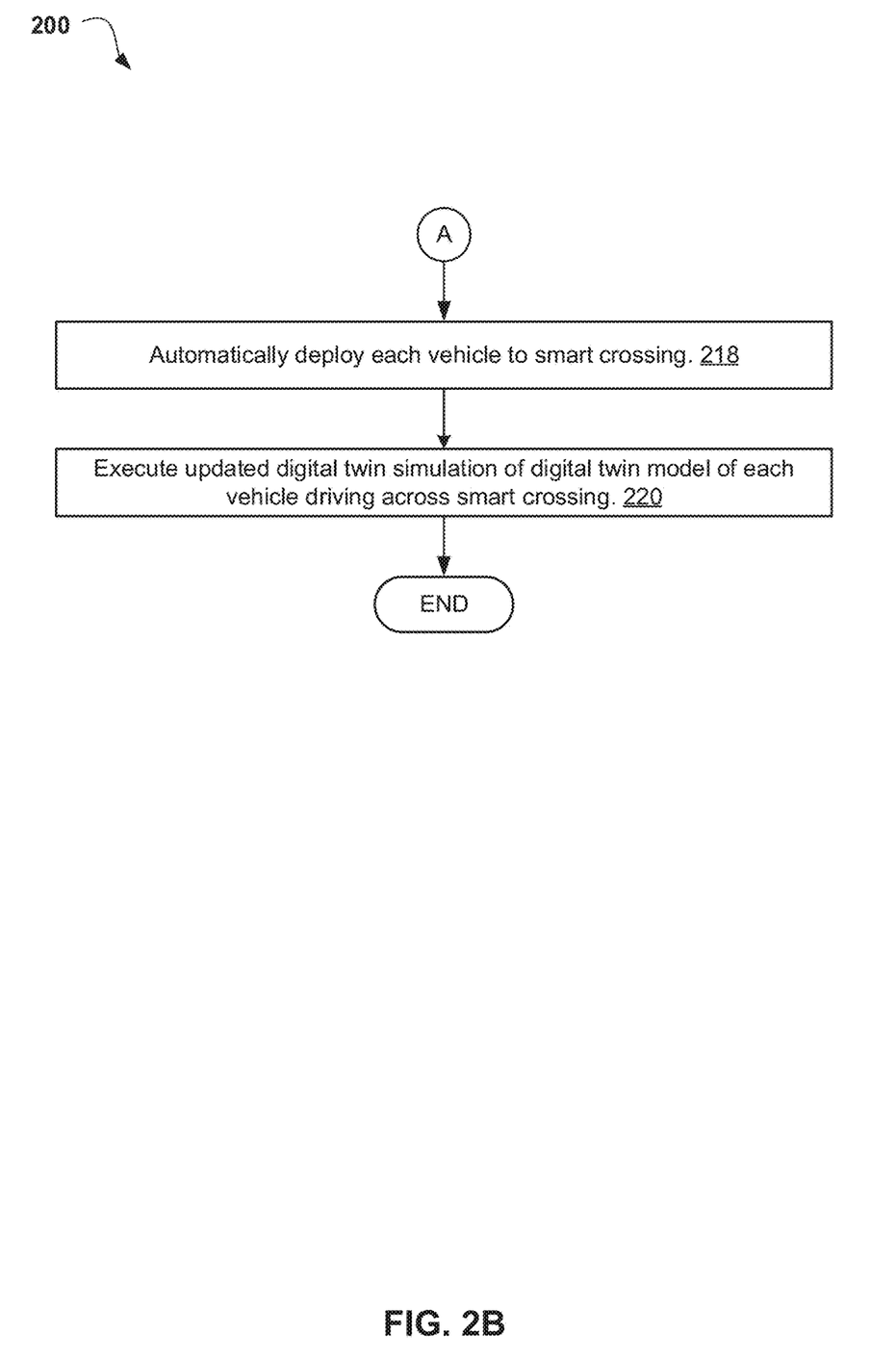

Referring now to FIGS. 2A and 2B, an operational flowchart for dynamically arranging vehicles on a smart crossing based on a load capacity of the smart crossing in a dynamic vehicle arrangement process 200 is depicted according to at least one embodiment. At 202, the vehicle arrangement program 150 receives the data relating to the maximum carrying capacity of the smart crossing having the one or more sensors measuring the one or more safety parameters of the smart crossing. As used herein, the "smart crossing" may be a bridge, tunnel, overpasses, viaduct, and/or cantilever portion of a roadway embedded with the one or more sensors.

The maximum carrying capacity of the smart crossing may be the maximum aggregated weight of vehicles and pedestrians the smart crossing can safely sustain. For example, the maximum carrying capacity of a bridge may be 50 tons. The maximum carrying capacity of the smart crossing in any city may be pre-defined by the engineers who designed the smart crossing and may be received by the vehicle arrangement program 150 from the remote database 130.

Examples of the sensors may include, but are not limited to, weight measurement sensors, force measurement sensors, frequency measurement sensors, and/or any other device for measuring the health of the smart crossing. The one or more sensors may be placed in different locations along the structure of the smart crossing. As described above, the various sensors may be utilized to measure the one or more safety parameters of the smart crossing. Examples of the safety parameter may include, but are not limited to, aggregated weight on the smart crossing, stresses in a truss, vibrations, oscillating frequency, and/or any other parameters measuring the overall health of the smart crossing.

Then, at 204, the vehicle arrangement program 150 predicts the current load carrying capacity of the smart crossing. The current load carrying capacity is predicted based on the maximum carrying capacity and the one or more safety parameters. As described above with respect to step 202, the maximum carrying capacity of the smart crossing may be pre-defined. However, due to wear and tear, the maximum carrying capacity of the smart crossing may gradually decrease over time. The wear and tear may be captured by the one or more sensors measuring the one or more safety parameters. For example, the maximum carrying capacity of the bridge may be 50 tons, but due to excessive weight, stress, and vibrations over time the maximum carrying capacity may be reduced to a current load carrying capacity of 40 tons. In another example, any cracks in the structure of the smart crossing may also reduce the maximum carrying capacity. Continuing the example, cracks in the support beams of the bridge may further reduce the maximum carrying capacity to a current load carrying capacity of 35 tons.

Next, at 206, the vehicle arrangement program 150 identifies the number of vehicles on the roadway traveling towards the smart crossing within the pre-defined distance of the smart crossing. The pre-defined distance may be a maximum distance away from the smart crossing on the roadway for which the vehicles are identified. For example, where the pre-defined distance is two miles (i.e., 3.22 kilometers), only those vehicles within the two miles of the smart crossing may be identified. Since some roadways may span hundreds or thousands of miles, it may be desirable to identify, and subsequently arrange, only those vehicles that are reasonably close to the smart crossing. The number of vehicles may be identified in advance before the vehicles physically reach the smart crossing.

According to at least one embodiment, the number of vehicles may be identified by a camera, such as a traffic camera recording video of the traffic flow on the roadway. For example, the camera may identify 10 vehicles within the pre-defined distance of the smart crossing. According to at least one other embodiment, the number of vehicles may be identified by a GPS system of the vehicles. For example, the data from the GPS system may indicate that there are 10 vehicles within the pre-defined distance of the smart crossing.

Then, at 208, the vehicle arrangement program 150 identifies the one or more specifications and the current arrangement of each vehicle within the pre-defined distance of the smart crossing. Upon identifying the number of vehicles within the pre-defined distance of the smart crossing, the vehicles may be classified according to vehicle type. Examples of the vehicle type may include, but are not limited to, passenger vehicles, emergency vehicles, busses, vans, trucks, and/or hazardous material vehicles (e.g., a vehicle carrying propane). The vehicle type may be determined from the camera and/or the GPS system described above with respect to step 206. For example, the vehicle arrangement program 150 may use computer vision techniques on the video feed from the camera to classify the vehicles. Continuing the example, a large yellow vehicle may be indicative of a school bus. In another example, a GPS system embedded in the vehicle may indicate the vehicle type. Continuing the example, a GPS system embedded in a car may indicate the vehicle type is a passenger vehicle.

Examples of the specification of each vehicle may include, but are not limited to, the aggregated weight of each vehicle, the length of each vehicle, and/or the number of wheels of each vehicle. The aggregated weight of a vehicle may be the sum of the self-weight of the vehicle and the cargo the vehicle is carrying (e.g., passengers, goods, and/or fuel). The aggregated weight of the vehicle may be identified from the vehicle type and/or weight measurement sensors in the vehicle or on the roadway. For example, many major roadways are equipped with weigh stations where certain vehicles, such as trucks and hazardous material vehicles, register their aggregated weight. Similarly, the length of the vehicle and/or the number of wheels of the vehicle may be identified from the vehicle type. For example, a truck carrying goods may have 18 wheels and be approximately 80 feet (i.e., 24.38 meters) in length.

The current arrangement of each vehicle within the pre-defined distance may include a distance (i.e., a space or gap) between each vehicle and a sequence of the vehicles. The sequence of the vehicles may be determined from the camera and/or the GPS system. For example, the camera and/or GPS system may indicate the following sequence of vehicles from closest to the smart crossing to farthest from the smart crossing: a truck, three passenger vehicles, and a van. The distance between each vehicle may be determined from the GPS system and/or peer-to-peer communication between the vehicles. For example, the vehicles may be equipped with object detection sensors that estimate distances from the vehicle to the object. Continuing the example described above, the distance between the truck and the first passenger vehicle may be 20 feet, the distance between each of the passenger vehicles may be 15 feet, and the distance between the third passenger vehicle and the van may be 10 feet.

Next, at 210, the vehicle arrangement program 150 executes the digital twin simulation of the digital twin model of each vehicle driving across the smart crossing. The digital twin simulation is executed in accordance with the one or more specifications and the current arrangement. The digital twin simulation may be executed prior to the vehicles physically reaching the smart crossing. The vehicle arrangement program 150 may use known techniques to create the digital twin model of each vehicle within the pre-defined distance of the smart crossing, and this digital twin model may be used in the digital twin simulation. The digital twin of each vehicle used in the simulation may have the same specifications each vehicle has in the real-world. For example, a truck carrying goods having 18 wheels, weighing two tons, and that is approximately 80 feet in length in the real-world may have a digital twin with the same specifications. Additionally, the digital twins of the vehicles used in the simulation may also have the same arrangement the vehicles currently have in the real-world. For example, where the distance between the truck and the first passenger vehicle is 20 feet, the distance between each of the passenger vehicles is 15 feet, and the distance between the third passenger vehicle and the van is 10 feet in the real-world, the digital twins of the vehicles may have the same arrangement in the digital twin simulation. In this manner, maximum accuracy may be preserved during the digital twin simulation.

Then, at 212, the vehicle arrangement program 150 determines whether the current load carrying capacity of the smart crossing is exceeded. The determination is made based on the executed digital twin simulation.

According to at least one embodiment, the current load carrying capacity of the smart crossing may be exceeded when the aggregated weight of the digital twin models of the vehicles on the smart crossing exceeds a current load carrying capacity weight threshold of the smart crossing in the digital twin simulation. For example, where the current load carrying capacity weight threshold of the smart crossing is 40 tons, and in the digital twin simulation the aggregated weight of the digital twin models of the vehicles on the smart crossing is 45 tons, the current load carrying capacity of the smart crossing may be exceeded.

According to at least one other embodiment, where the smart crossing is a bridge or other suspended structure, the current load carrying capacity of the smart crossing may be exceeded when an allowed peak stress distribution at any point on a bridge, represented by $\Delta f_1$, is exceeded, where the value of $\Delta f_1$ may be determined according to known techniques. As long as the value of $\Delta f_1$ is not exceeded during the digital twin simulation, the current load carrying capacity of the smart crossing may not be exceeded and within the allowable limit.

In response to determining the current load carrying capacity of the smart crossing is exceeded (step 212, "Yes" branch), the dynamic vehicle arrangement process 200 proceeds to step 214 to assign the priority level to each vehicle within the pre-defined distance based on the classification of each vehicle. In response to determining the current load carrying capacity of the smart crossing is not exceeded (step 212, "No" branch), the dynamic vehicle arrangement process 200 ends.

Next, at 214, the vehicle arrangement program 150 assigns the priority level to each vehicle within the pre-defined distance of the smart crossing. The priority level is assigned based on the classification of each vehicle. The priority level may include, but is not limited to, high priority, medium priority, and low priority. For example, a bus carrying multiple passengers, a hazardous material vehicle, and a truck and/or van carrying goods may be assigned a medium priority level. In another example, the passenger vehicle may be assigned a low priority level.

According to at least one embodiment, whenever the emergency vehicle is detected within the pre-defined distance, the emergency vehicle may be assigned a high priority level. Examples of the emergency vehicle may include, but are not limited to, an ambulance, a police car, a fire truck, and/or a tow truck.

According to at least one other embodiment, the passenger vehicle may be assigned the high priority level whenever biometric sensors in the vehicle or in a device of a passenger indicate an abnormal condition in one or more of the passengers. For example, if one of the passengers develops a fever or increased heart rate, the passenger vehicle transporting the passenger with the fever or increased heart rate may be assigned the high priority level.

Then, at 216, the vehicle arrangement program 150 predicts the modification of the current arrangement of each vehicle. The prediction is made based on the priority level of each vehicle and the one or more specifications.

According to at least one embodiment, the modification of the current arrangement of each vehicle may include adapting the sequence of the vehicles in decreasing order from high priority to low priority. For example, the high priority level vehicles may be positioned first in the sequence closest to the smart crossing, followed by the medium priority level vehicles, where the medium priority vehicles are followed by the low priority level vehicles.

According to at least one other embodiment, the modification of the current arrangement of each vehicle may include adapting the distance between each vehicle. For example, where the current distance between the truck and the first passenger vehicle is 20 feet, the current distance between each of the passenger vehicles is 15 feet, and the current distance between the third passenger vehicle and the van is 10 feet, the adapted distance between the truck and the first passenger vehicle may be 15 feet, the adapted distance between each of the passenger vehicles may be 25 feet, and the adapted distance between the third passenger vehicle and the van may be 20 feet. Since longer vehicles have more wheels to distribute the aggregated weight of these vehicles more uniformly across the smart crossing, any point on the smart crossing in contact with the wheels may experience less weight. Thus, the distance between the longer vehicle having more wheels and any subsequent vehicle may be reduced, such as in the example described above.

Next, at 218, the vehicle arrangement program 150 automatically deploys each vehicle to the smart crossing. The vehicles are deployed consistent with the modification of the current arrangement of each vehicle. The vehicle arrangement program 150 may send a signal to each vehicle to cause the vehicle to adapt the sequence of the vehicles and the distance between each vehicle. For example, where the adapted sequence of the vehicles in decreasing order from high priority to low priority is an emergency vehicle, a truck, and three passenger vehicles, the vehicle arrangement program 150 may deploy the vehicles in that particular sequence. In another example, where the adapted distance between the truck and the first passenger vehicle is 15 feet, the adapted distance between each of the passenger vehicles is 25 feet, and the adapted distance between the third passenger vehicle and the van is 20 feet, the vehicle arrangement program 150 may deploy the vehicles with those particular distances between each vehicle.

According to at least one embodiment, the automatic deployment of each vehicle to the smart crossing may include automatically controlling an acceleration and a deceleration of at least one vehicle to adapt the current arrangement of each vehicle. For example, the speed of the at least one vehicle may be adapted to sequence the vehicles according to the modification of the current arrangement. In another example, the speed of the at least one vehicle may be adapted to adjust the distance between each vehicle.

Then, at 220, the vehicle arrangement program 150 executes the updated digital twin simulation of the digital twin model of each vehicle driving across the smart crossing. The updated digital twin simulation is executed in accordance with the modification of the current arrangement. The updated digital twin simulation may validate the prediction made in step 216 and, according to at least one embodiment, may be executed prior to the automatic deployment of each vehicle to the smart crossing. In response to determining the predicted modification of the current arrangement of each vehicle exceeds the current load carrying capacity of the smart crossing, the execution of the updated digital twin simulation may be iterated with an updated modification of the current arrangement of each vehicle. The prediction may be validated when the predicted modification of the current arrangement does not exceed the current load carrying capacity of the smart crossing.

Figure 3:
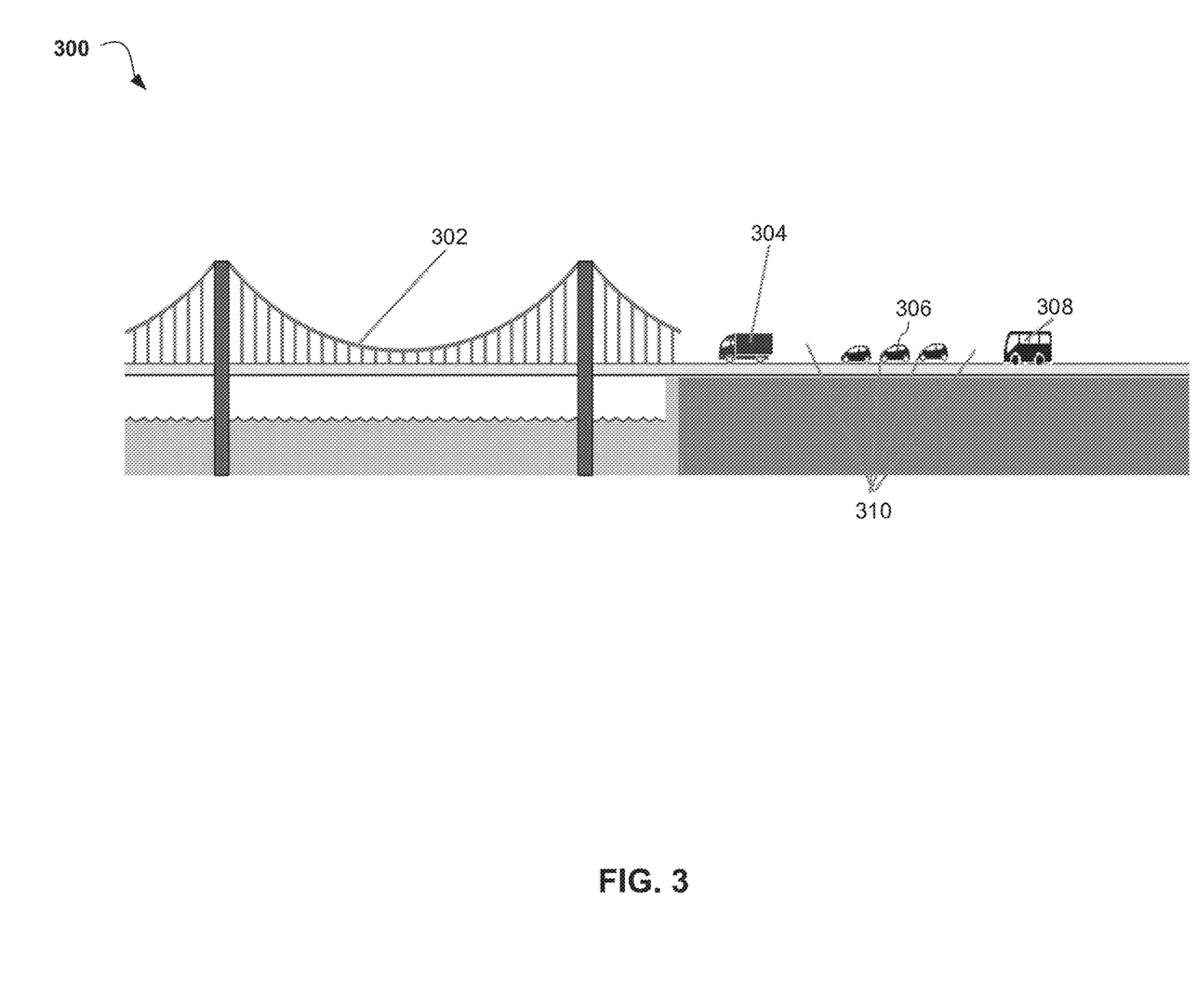
FIG. 3 is an exemplary diagram depicting the dynamic arrangement of different types of vehicles on the smart crossing according to at least one embodiment.

Referring now to FIG. 3, an exemplary diagram 300 depicting the dynamic arrangement of different types of vehicles on the smart crossing 302 is shown according to at least one embodiment. In the diagram 300, the smart crossing 302 may be a bridge. A truck 304, a plurality of passenger vehicles 306, and a van 308 may be deployed in decreasing order from high priority to low priority along the roadway proactively prior to physically reaching the smart crossing 302. The distances 310 between the truck 304, the plurality of passenger vehicles 306, and the van 308 may be dynamically adapted such that the aggregated weight of the truck 304, the plurality of passenger vehicles 306, and the van 308 is distributed uniformly across the smart crossing 302.

It may be appreciated that FIGS. 2A, 2B, and 3 provide only an illustration of one implementation and do not imply any limitations with regard to how different embodiments may be implemented. Many modifications to the depicted environments may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of dynamically arranging vehicles on a smart crossing, the method comprising:
   receiving data relating to a maximum carrying capacity of a smart crossing having one or more sensors measuring one or more safety parameters of the smart crossing;
   predicting a current load carrying capacity of the smart crossing based on the maximum carrying capacity and the one or more safety parameters;
   identifying a number of vehicles on a roadway traveling towards the smart crossing within a pre-defined distance of the smart crossing, wherein the pre-defined distance is a maximum distance away from the smart crossing on a roadway for which the number of vehicles is identified;
   identifying one or more specifications and a current arrangement of each vehicle within the pre-defined distance of the smart crossing;
   executing a digital twin simulation of a digital twin model of each vehicle within the pre-defined distance driving across the smart crossing in accordance with the one or more specifications and the current arrangement, wherein the digital twin model of each vehicle within the pre-defined distance has identical specifications and an identical current arrangement to that of a corresponding vehicle traveling on the roadway;
   determining whether the current load carrying capacity of the smart crossing is exceeded based on the executed digital twin simulation;
   in response to determining the current load carrying capacity is exceeded, assigning a priority level to each vehicle within the pre-defined distance based on a classification of each vehicle;
   predicting a modification of the current arrangement of each vehicle based on the priority level of each vehicle and the one or more specifications; and
   automatically deploying each vehicle to the smart crossing consistent with the modification of the current arrangement of each vehicle.

2. The computer-based method of claim 1, wherein automatically deploying each vehicle to the smart crossing further comprises:
   automatically controlling an acceleration and a deceleration of at least one vehicle to adapt the current arrangement of each vehicle.

3. The computer-based method of claim 2, wherein the modification of the current arrangement of each vehicle includes adapting a distance between each vehicle and a sequence of the vehicles.

4. The computer-based method of claim 1, further comprising:
   executing an updated digital twin simulation of the digital twin model of each vehicle driving across the smart crossing in accordance with the modification of the current arrangement to validate the prediction.

5. The computer-based method of claim 1, wherein an emergency vehicle detected within the pre-defined distance is assigned a high priority level, and wherein any vehicle having the high priority level is first in the modification of the current arrangement.

6. The computer-based method of claim 1, wherein the specification of each vehicle within the pre-defined distance of the smart crossing is selected from a group consisting of an aggregated weight of each vehicle, a length of each vehicle, and a number of wheels of each vehicle.

7. A computer system, the computer system comprising:
   one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:
   receiving data relating to a maximum carrying capacity of a smart crossing having one or more sensors measuring one or more safety parameters of the smart crossing;
   predicting a current load carrying capacity of the smart crossing based on the maximum carrying capacity and the one or more safety parameters;
   identifying a number of vehicles on a roadway traveling towards the smart crossing within a pre-defined distance of the smart crossing, wherein the pre-defined distance is a maximum distance away from the smart crossing on a roadway for which the number of vehicles is identified;
   identifying one or more specifications and a current arrangement of each vehicle within the pre-defined distance of the smart crossing;
   executing a digital twin simulation of a digital twin model of each vehicle within the pre-defined distance driving across the smart crossing in accordance with the one or more specifications and the current arrangement, wherein the digital twin model of each vehicle within the pre-defined distance has identical specifications and an identical current arrangement to that of a corresponding vehicle traveling on the roadway;
   determining whether the current load carrying capacity of the smart crossing is exceeded based on the executed digital twin simulation;

in response to determining the current load carrying capacity is exceeded, assigning a priority level to each vehicle within the pre-defined distance based on a classification of each vehicle;

predicting a modification of the current arrangement of each vehicle based on the priority level of each vehicle and the one or more specifications; and automatically deploying each vehicle to the smart crossing consistent with the modification of the current arrangement of each vehicle.

8. The computer system of claim 7, wherein automatically deploying each vehicle to the smart crossing further comprises:

automatically controlling an acceleration and a deceleration of at least one vehicle to adapt the current arrangement of each vehicle.

9. The computer system of claim 8, wherein the modification of the current arrangement of each vehicle includes adapting a distance between each vehicle and a sequence of the vehicles.

10. The computer system of claim 7, further comprising:

executing an updated digital twin simulation of the digital twin model of each vehicle driving across the smart crossing in accordance with the modification of the current arrangement to validate the prediction.

11. He computer system of claim 7, wherein an emergency vehicle detected within the pre-defined distance is assigned a high priority level, and wherein any vehicle having the high priority level is first in the modification of the current arrangement.

12. The computer system of claim 7, wherein the specification of each vehicle within the pre-defined distance of the smart crossing is selected from a group consisting of an aggregated weight of each vehicle, a length of each vehicle, and a number of wheels of each vehicle.

13. A computer program product, the computer program product comprising:

one or more computer-readable tangible storage medium and program instructions stored on at least one of the one or more computer-readable tangible storage medium, the program instructions executable by a processor capable of performing a method, the method comprising:

receiving data relating to a maximum carrying capacity of a smart crossing having one or more sensors measuring one or more safety parameters of the smart crossing;

predicting a current load carrying capacity of the smart crossing based on the maximum carrying capacity and the one or more safety parameters;

identifying a number of vehicles on a roadway traveling towards the smart crossing within a pre-defined distance of the smart crossing, wherein the pre-defined distance is a maximum distance away from the smart crossing on a roadway for which the number of vehicles is identified;

identifying one or more specifications and a current arrangement of each vehicle within the pre-defined distance of the smart crossing;

executing a digital twin simulation of a digital twin model of each vehicle within the pre-defined distance driving across the smart crossing in accordance with the one or more specifications and the current arrangement, wherein the digital twin model of each vehicle within the pre-defined distance has identical specifications and an identical current arrangement to that of a corresponding vehicle traveling on the roadway;

determining whether the current load carrying capacity of the smart crossing is exceeded based on the executed digital twin simulation;

in response to determining the current load carrying capacity is exceeded, assigning a priority level to each vehicle within the pre-defined distance based on a classification of each vehicle;

predicting a modification of the current arrangement of each vehicle based on the priority level of each vehicle and the one or more specifications; and automatically deploying each vehicle to the smart crossing consistent with the modification of the current arrangement of each vehicle.

14. The computer program product of claim 13, wherein automatically deploying each vehicle to the smart crossing further comprises:

automatically controlling an acceleration and a deceleration of at least one vehicle to adapt the current arrangement of each vehicle.

15. The computer program product of claim 14, wherein the modification of the current arrangement of each vehicle includes adapting a distance between each vehicle and a sequence of the vehicles.

16. The computer program product of claim 13, further comprising:

executing an updated digital twin simulation of the digital twin model of each vehicle driving across the smart crossing in accordance with the modification of the current arrangement to validate the prediction.

17. The computer program product of claim 13, wherein an emergency vehicle detected within the pre-defined distance is assigned a high priority level, and wherein any vehicle having the high priority level is first in the modification of the current arrangement.

* * * * *